United States Patent
Tai

(12) United States Patent (10) Patent No.: US 6,798,098 B1
Tai (45) Date of Patent: Sep. 28, 2004

(54) HEAT-RADIATING STRUCTURE FOR CEILING FAN'S MOTOR HOUSING

(76) Inventor: Chun Ya Tai, 9F, No. 92, Jing-Cheng Road, Taichung City (TW)

( * ) Notice: Subject to any disclaimer, the term of this patent is extended or adjusted under 35 U.S.C. 154(b) by 0 days.

(21) Appl. No.: 10/684,176

(22) Filed: Oct. 10, 2003

(51) Int. Cl.$^7$ .............................................. H02K 11/00
(52) U.S. Cl. ...................... 310/67 R; 310/62; 310/63; 310/89; 310/58; 310/60 R; 310/52
(58) Field of Search ................................ 31/63; 310/62, 310/67 R, 89, 58, 52, 60 R

(56) References Cited

U.S. PATENT DOCUMENTS 5,883,449 A * 3/1999 Mehta et al. ............. 310/60 R
6,400,051 B1 * 6/2002 Hsieh ........................... 310/89
6,744,157 B2 * 6/2004 Choi ............................ 310/62

\* cited by examiner

*Primary Examiner*—Dang Le
*Assistant Examiner*—Iraj A. Mohandesi
(74) *Attorney, Agent, or Firm*—Charles E. Baxley

(57) ABSTRACT

A heat-radiating structure for ceiling fan's motor housing, on the upper and the lower surfaces of a motor housing is provided with arched ears, each ear is provided with a ventilation orifice for sucking outside in and blowing it out; on the periphery of the motor housing is defined with inclined flow deflectors for introducing outside air in and expelling it out, with these structures, the motor housing itself is possess with an ability of heat-radiating.

2 Claims, 5 Drawing Sheets

US 6,798,098 B1

HEAT-RADIATING STRUCTURE FOR CEILING FAN'S MOTOR HOUSING

BACKGROUND OF THE INVENTION

1. Field of the Invention

The present invention relates to a ceiling fan, and more particularly to a heat-radiating structure for ceiling fan's motor housing.

2. Description of the Prior Arts

With reference to FIGS. 1 and 2, a conventional motor housing for ceiling fan includes an upper cover 10 and a lower cover 20. The upper cover 10 is provided with plural air strip holes 11, and to the lower surface of the upper cover 10 a fan 12 is mounted. The lower cover 20 includes a base portion 21 and a rotor portion 22, on the base portion 21 is provided with plural air strip holes 211, whereas about the peripheries of the upper and the lower surfaces of the rotor portion 22 are equidistantly provided with plural spacers 221 so as to form ventilation orifices 222. Furthermore, on the internal sidewall of the rotor portion 22 is annularly defined with magnetic inductive portion 223. In the motor housing that formed by the upper and the lower covers 10, 20 is defined with a stator 30. The stator 30 includes an electromagnet portion 31 wound with coils. During rotation of the ceiling fan, a great amount of heat is produced both by the electromagnet portion 31 of the stator 30 and the magnetic inductive portion 223 of the lower cover 20, at the moment, with the rotation of fan 12 of the upper cover 10, air inside the upper portion of the housing will be expelled out through the ventilation orifices 222 of the lower cover 20, so as to create suction pressure inside the upper portion of the housing, meanwhile air under the housing enters the housing via the air strip holes 211 of the lower cover 20 so as to produce convection current. By this way, the housing can be cooled down. However, there are still some disadvantages of this heating-radiating structure need to improved as follows:

First, since the inner space of the housing is not big, the fan 12 installed on the lower surface of the upper cover 10 should be small in size in order to be received in the housing, the convection effect caused by the fan 12 will be relatively poor, and as a result, the effect of heat-radiating of the motor housing is poor. Furthermore, the fan 12 is not easy to be assembled in the motor housing and thus the production cost is relatively increased.

Second, the upper and the lower covers 10, 20 are provided with no flow guiding structure, during rotation, the motor housing is not able to suck outside air in and expel it out by itself. The effect of heat-radiating will be poor due to only the fan 12 is employed to expel air.

The present invention has arisen to mitigate and/or obviate the afore-described disadvantages of the conventional heat-radiating structure for ceiling fan's motor housing.

SUMMARY OF THE INVENTION

The primary object of the present invention is to provide a heat-radiating structure for ceiling fan's motor housing wherein on the upper and the lower surfaces of a the motor housing is provided with arched ears, and on the periphery of the motor housing is defined with inclined flow deflectors, with these structures, the ceiling fan's motor housing itself is possess with an ability of heat-radiating.

The present invention will become more obvious from the following description when taken in connection with the accompanying drawings, which shows, for purpose of illustrations only, the preferred embodiment in accordance with the present invention.

DETAILED DESCRIPTION OF THE PREFERRED EMBODIMENT

Figure 1:
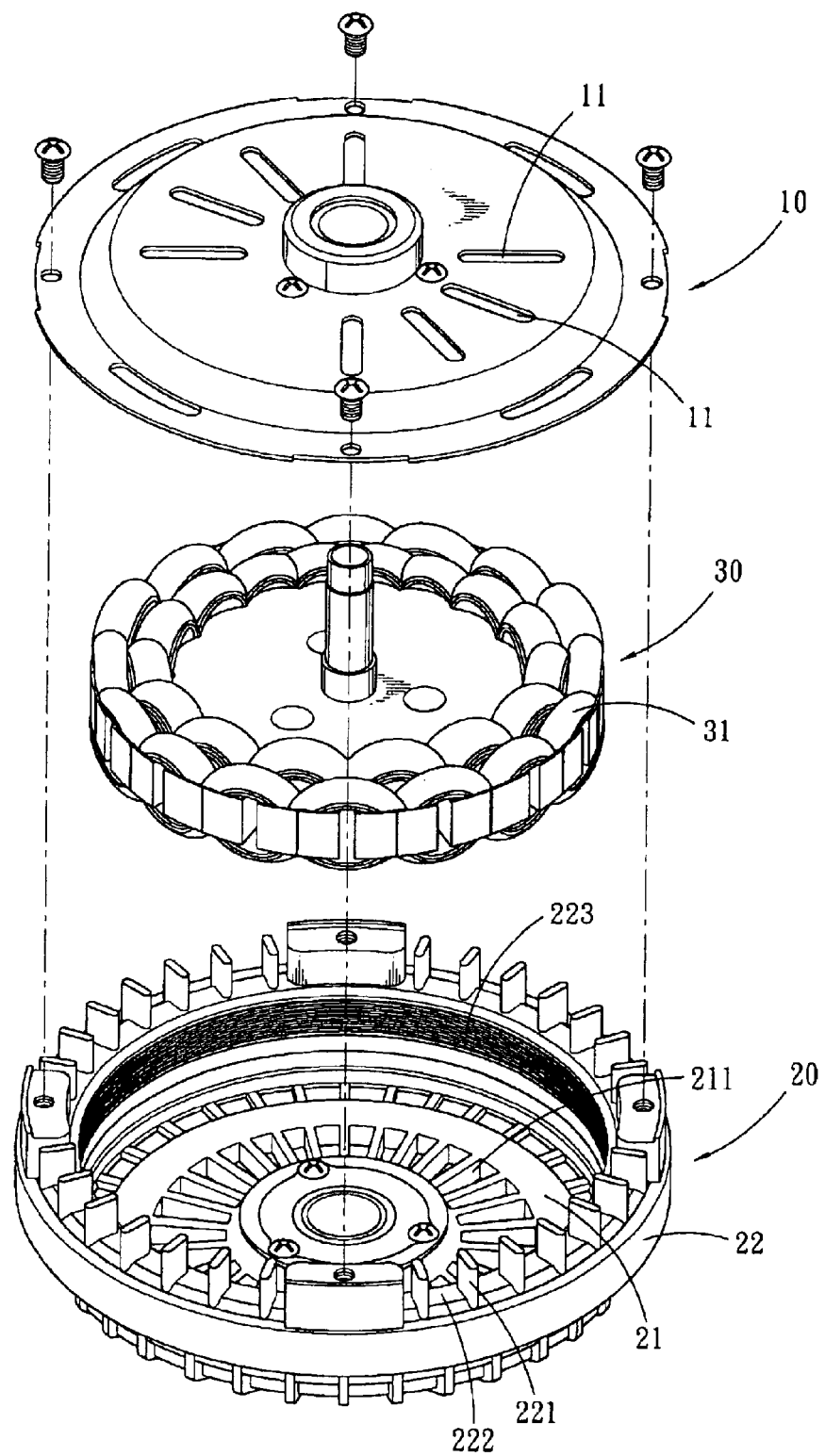
FIG. 1 is an exploded view of a conventional ceiling fan's motor housing.
Figure 2:
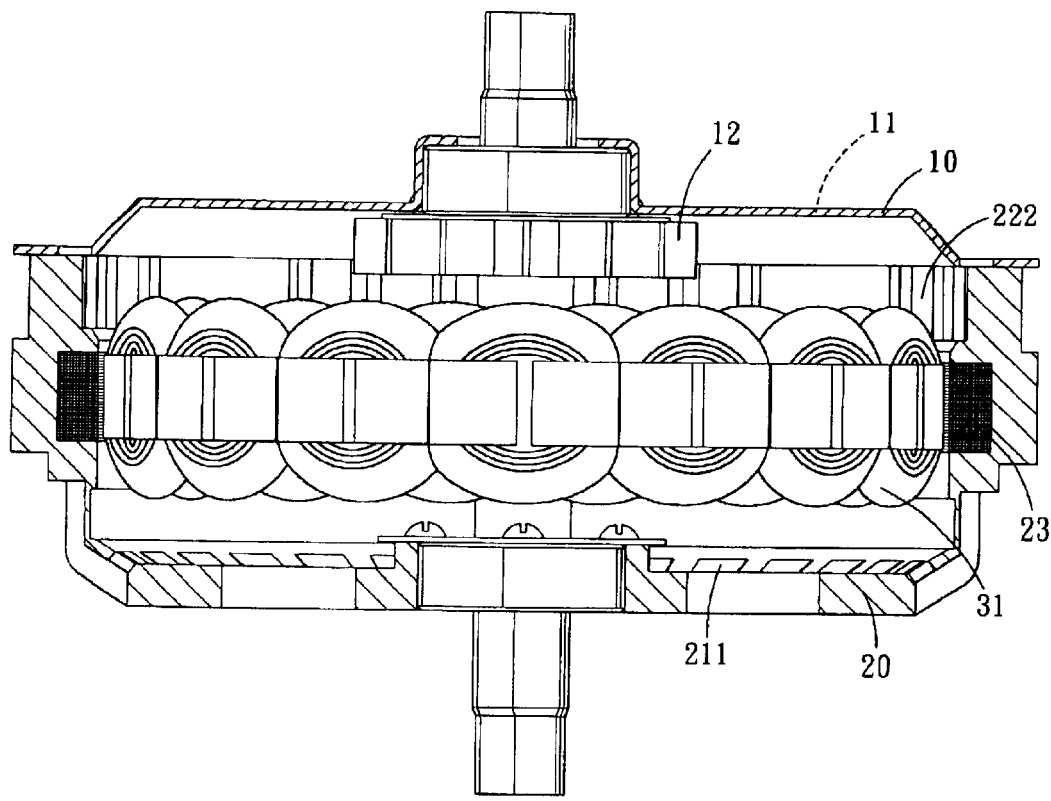
FIG. 2 is a cross sectional view of the conventional ceiling fan's motor housing.
Figure 3:
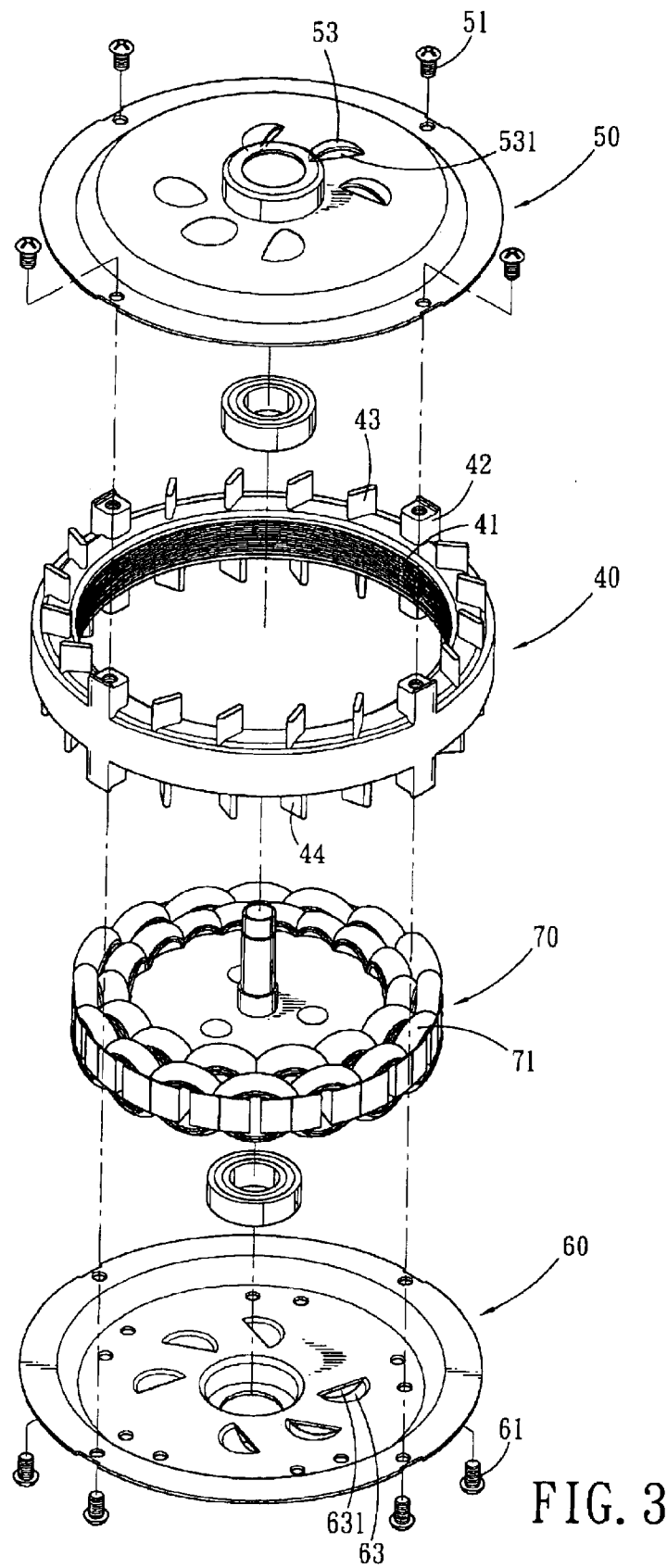
FIG. 3 is an exploded view of a heat-radiating structure for ceiling fan's motor housing in accordance with the present invention.
Figure 4:
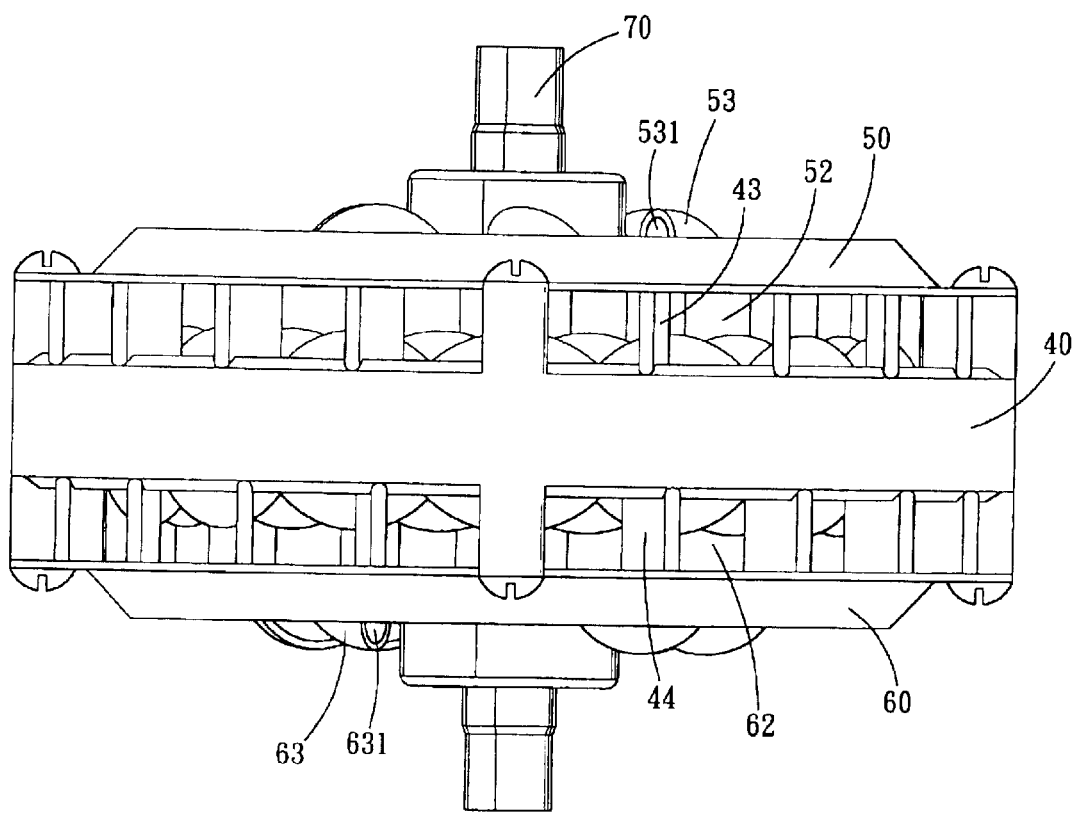
FIG. 4 is a side view of the heat-radiating structure for ceiling fan's motor housing in accordance with the present invention.

Referring to FIGS. 3 and 4, wherein a heat-radiating structure for ceiling fan's motor housing is shown and generally comprising: a rotor 40, an upper cover 50 and a lower cover 60. Inside the housing is provided with a stator 70 which including an electromagnet portion 71 wound with coils.

The rotor 40 is an annular member, on the internal annular sidewall of which is provided with magnetic inductive portion 41. About the periphery of an upper and a lower surfaces of the rotor 40 is equidistantly defined with four locking lugs 42. Between the respective locking lugs 42 are further equidistantly defined with plural upper and lower flow deflectors 43, 44, the upper and the lower flow deflectors 43, 44 are laterally inclined. The upper flow deflectors 43 are equidirectionally and inclinedly arranged and the lower flow deflectors 44 are inclinedly arranged in a reversed direction to the upper flow deflectors 43.

The upper cover 50 is a disc-shaped member, which is fixed to the upper locking lugs 40 of the rotor 40 by virtue of screws 51, so as to define upper ventilation apertures 52 with respect to the respective upper flow deflectors 43 on the rotor 40. On the top surface of the upper cover 50 is annularly provided with plural arched ears 53, each of the respective ears 53 is provided with a ventilation orifice 531, the respective ventilation orifices 531 are equidirectionally arranged (clockwise direction).

The lower cover 60 is disc-shaped and fixed to the lower locking lugs 42 of the rotor 40 by virtue of screws 61, so as to form lower ventilation apertures 62 with respect to the respective lower flow deflectors 44 on the rotor 40. On the lower surface of the lower cover 60 is provided with plural arched ears 63, each of the ears 63 is provided with a ventilation orifice 631, the respective ventilation orifices 631 are equidirectionally arranged (counterclockwise)), in other words, the ventilation orifices 631 of the respective arched ears 63 are arranged in a reversed direction to that of the respective arched ears 53.

Figure 5:
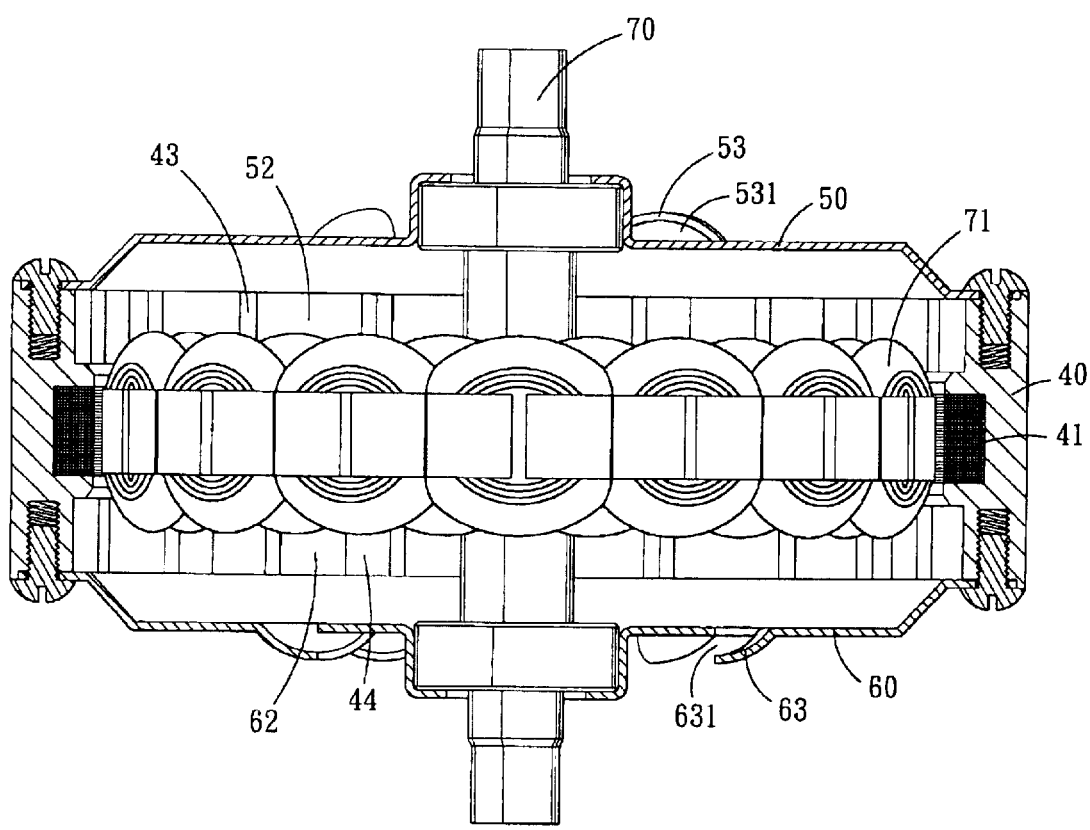
FIG. 5 is a cross sectional view of the heat-radiating structure for ceiling fan's motor housing in accordance with the present invention.

Referring to FIG. 5, in case of clockwise rotation of the ceiling fan's motor housing, outside air will enter the housing through the respective ventilation orifices 531 and then will flow out via the ventilation orifices 631 of the respective arched ears 63, so as to improve convection effect in the ceiling fan's motor housing, in this way, the flowing air quick carry away the heat generated both by the electromagnet portion 71 of the stator 70 and the magnetic inductive portion 41 of the rotor 40, such that the motor housing is possessed with a superior heat-radiating ability. In addition, the respective upper flow deflectors 43 on the rotor 40 have a lateral inclined angle, and the upper cover 50 forms plural upper ventilation apertures 52 with respect to the rotor 40, in this case, outside air can be introduced by the respective flow deflectors 43, via the upper ventilation apertures 52, into the motor housing, and then flow out via the lower ventilation apertures 62 formed both by the lower cover 60 and the rotor 40, such structure further improves the convection effect of the motor housing, and thus the heat can be effectively carried away from the electromagnet portion 71 of the stator 70 and the magnetic inductive portion 41 of the rotor 40.

Vice versa, in case of counterclockwise rotation of the ceiling fan's motor housing, outside air will enter the motor housing through the ventilation orifices 631 of the respective arched ears 63, and then flow out through the respective ventilation orifices 531 of the arched ears 53. At the same time, outside air can be introduced by the respective flow deflectors 43, via the lower ventilation apertures 62, into the motor housing, and then flow out via the upper ventilation apertures 52 formed both by the upper cover 50 and the rotor 40, and thus the heat can be effectively carried away from the electromagnet portion 71 of the stator 70 and the magnetic inductive portion 41 of the rotor 40. Thereby, in case of counterclockwise rotation of the motor housing, the heat radiation effect is also good.

While we have shown and described various embodiments in accordance with the present invention, it should be clear to those skilled in the art that further embodiments may be made without departing from the scope of the present invention.

What is claimed is:

1. A heat-radiating structure for ceiling fan's motor housing comprising:
    a stator disposed in a housing;
    a rotor, at both an upper surface and a lower surface of which is equidistantly defined with upper flow deflectors and lower flow deflectors, the upper flow deflectors equidirectionally and inclinedly arranged and the lower flow deflectors inclinedly arranged in a reversed direction to the upper flow deflectors;
    an upper cover fixed to the upper surface of the rotor, on the top surface of the upper cover annularly provided with plural arched ears, each of the respective ears provided with a ventilation orifice, the respective ventilation orifices equidirectionally arranged;
    a lower cover fixed to the lower surface of the rotor, on the lower surface of which is annularly provided with arched ears, each of the respective ears provided with a ventilation orifice, the respective ventilation orifices equidirectionally arranged in a reversed direction to the ventilation orifices of the upper cover.

2. The heat-radiating structure for ceiling fan's motor housing as claimed in claim 1, wherein the upper flow deflectors and lower flow deflectors on the rotor are laterally inclinedly arranged.

* * * * *